(12) United States Patent
Wakazono

(10) Patent No.: US 11,500,174 B2
(45) Date of Patent: Nov. 15, 2022

(54) DISPLAY CONTROL DEVICE AND DISPLAY CONTROL METHOD

(71) Applicant: SONY CORPORATION, Tokyo (JP)

(72) Inventor: Masafumi Wakazono, Tokyo (JP)

(73) Assignee: SONY CORPORATION, Tokyo (JP)

( * ) Notice: Subject to any disclaimer, the term of this patent is extended or adjusted under 35 U.S.C. 154(b) by 73 days.

(21) Appl. No.: 16/927,302

(22) Filed: Jul. 13, 2020

(65) Prior Publication Data

US 2020/0341237 A1 Oct. 29, 2020

Related U.S. Application Data

(63) Continuation of application No. 15/580,310, filed as application No. PCT/JP2016/002204 on Apr. 26, 2016, now Pat. No. 10,761,294.

(30) Foreign Application Priority Data

Jun. 18, 2015 (JP) .................................. 2015-122838

(51) Int. Cl.
*G02B 7/28* (2021.01)
*H04N 5/232* (2006.01)
*G02B 7/36* (2021.01)
*G03B 3/10* (2021.01)

(52) U.S. Cl.
CPC ............... *G02B 7/28* (2013.01); *G02B 7/365* (2013.01); *G03B 3/10* (2013.01); *H04N 5/23248* (2013.01); *H04N 5/23258* (2013.01); *H04N 5/232123* (2018.08); *H04N 5/232945* (2018.08)

(58) Field of Classification Search
CPC ........ G02B 27/16; G02B 27/40; G03B 13/18; G03B 13/20; G03B 13/22; G03B 13/24; G03B 13/26; G03B 13/28; G03B 13/30
See application file for complete search history.

(56) References Cited

U.S. PATENT DOCUMENTS

| 9,704,250 | B1 | 7/2017 | Shah et al. | |
| 2003/0002870 | A1* | 1/2003 | Baron | H04N 5/232945 396/147 |
| 2003/0063212 | A1* | 4/2003 | Watanabe | H04N 5/232123 348/349 |

(Continued)

FOREIGN PATENT DOCUMENTS

| CN | 104125377 A | 10/2014 |
| CN | 104641627 A | 5/2015 |

(Continued)

OTHER PUBLICATIONS

Office Action for JP Patent Application No. 2020-159950, dated Aug. 3, 2021, 03 pages of English Translation and 03 pages of Office Action.

(Continued)

*Primary Examiner* — James M Hannett
*Assistant Examiner* — Dwight Alex C Tejano
(74) *Attorney, Agent, or Firm* — Chip Law Group

(57) ABSTRACT

Provided is a display control device including a display control unit that controls display, on a display unit, of highlighting an edge portion of a subject corresponding to a state of an image depending on an in-focus state of the subject in the image being within a predetermined in-focus near range.

21 Claims, 11 Drawing Sheets

(56) References Cited

U.S. PATENT DOCUMENTS

| | | | |
|---|---|---|---|
| 2009/0109310 A1* | 4/2009 | Kobayashi | H04N 5/142 348/302 |
| 2009/0231454 A1* | 9/2009 | Miura | H04N 5/23245 348/220.1 |
| 2010/0157127 A1 | 6/2010 | Takayanagi et al. | |
| 2012/0106938 A1* | 5/2012 | Yonekawa | G03B 13/36 396/125 |
| 2013/0250145 A1* | 9/2013 | Miura | H04N 5/23235 348/239 |
| 2014/0267872 A1* | 9/2014 | Okamoto | H04N 5/232945 348/333.08 |
| 2014/0313393 A1 | 10/2014 | Kinoshita et al. | |
| 2014/0333790 A1 | 11/2014 | Wakazono | |
| 2015/0042866 A1 | 2/2015 | Wakazono | |
| 2015/0116551 A1 | 4/2015 | Kindaichi et al. | |

FOREIGN PATENT DOCUMENTS

| | | |
|---|---|---|
| EP | 2878983 A1 | 6/2015 |
| JP | 2000-125179 A | 4/2000 |
| JP | 2001-333299 A | 11/2001 |
| JP | 2003-046844 A | 2/2003 |
| JP | 2010-114556 A | 5/2010 |
| JP | 2010-135865 A | 6/2010 |
| JP | 2010-145693 A | 7/2010 |
| JP | 2010-177741 A | 8/2010 |
| JP | 2012-145840 A | 8/2012 |
| JP | 2012-160942 A | 8/2012 |
| JP | 2013-186293 A | 9/2013 |
| JP | 2014-216715 A | 11/2014 |
| JP | 2015-034869 A | 2/2015 |
| JP | 2015-059998 A | 3/2015 |
| JP | 2015-088769 A | 5/2015 |
| JP | 2020-159950 A | 10/2020 |
| WO | 2015/040935 A1 | 3/2015 |

OTHER PUBLICATIONS

International Search Report and Written Opinion of PCT Application No. PCT/JP2016/002204, dated Aug. 2, 2016, 09 pages of English Translation and 11 pages of ISRWO.

International Preliminary Report on Patentability of PCT Application No. PCT/JP2016/002204, dated Dec. 28, 2017, 11 pages of English Translation and 06 pages of IPRP.

Office Action for JP Patent Application No. 2020-159950, dated Feb. 1, 2022, 02 pages of English Translation and 03 pages of Office Action.

* cited by examiner

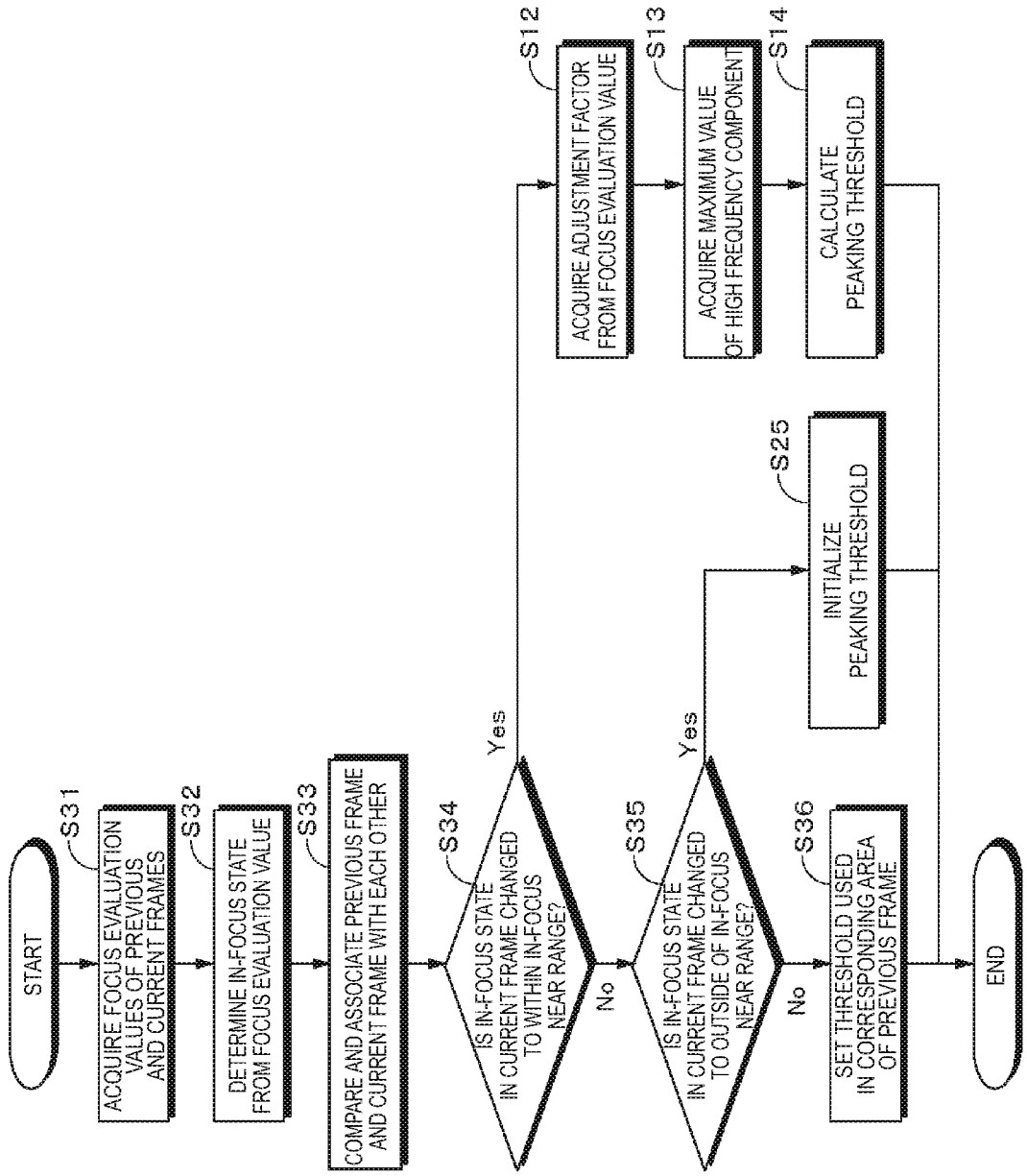

DISPLAY CONTROL DEVICE AND DISPLAY CONTROL METHOD

This application is a continuation of U.S. patent application Ser. No. 15/580,310, filed Dec. 7, 2017, which is a U.S. National Phase of International Patent Application No. PCT/JP2016/002204 filed Apr. 26, 2016, which claims priority benefit of Japanese Patent Application No. JP 2015-122838 filed in the Japan Patent Office on Jun. 18, 2015. Each of the above-referenced applications is hereby incorporated herein by reference in its entirety.

TECHNICAL FIELD

The present technology relates to a display control device, a display control method, and a display control program.

BACKGROUND ART

In the manual focusing of a digital camera, a photographer searches for a focus position where a subject becomes sharpest on a monitoring image by adjusting the focus position of a lens, thereby performing a focusing operation. An assist function called peaking is developed to improve the accuracy of this focusing (Patent Literature 1).

In the peaking, a marker serving as an auxiliary signal is displayed in a sharp portion of the monitoring image. A photographer is able to adjust focusing easily by searching for a focus position where the largest number of markers is displayed on a subject. Compared to the sharpness of the image, the marker has higher visibility than the sharpness of the image, so the peaking function has an effect of facilitating the focusing operation.

In the peaking, it is determined that the portion where the energy of a high frequency component exceeds a threshold in the input image is in focus, and a marker is rendered to a pixel determined to be in focus.

CITATION LIST

Patent Literature

Patent Literature 1:
JP 2010-114556A

DISCLOSURE OF INVENTION

Technical Problem

However, the magnitude of the energy of a high frequency component in the monitoring image is affected not only by the degree of focusing but also by frequency characteristics of a subject itself. In one example, in a subject having high contrast and texture with edge, the high frequency component tends to be high. Conversely, in a subject having low contrast and smooth texture, the high frequency component tends to be low. In the former case, displayed peaking markers will be saturated before achieving focusing. In the latter case, there is no marker displayed even if focusing is achieved. In either case, the marker is not displayed properly, so there is a problem that the peaking function fails to assist the focus operation.

The present technology is made in view of such problems, and is intended to provide a display control device, display control method, and display control program, capable of performing optimum peaking regardless of subjects, shooting conditions, or the like.

Solution to Problem

To solve the above-described problem, a first technique is a display control device including: a display control unit configured to control display, on a display unit, of highlighting corresponding to a state of an image depending on an in-focus state of a subject in the image being within a predetermined in-focus near range.

Further, a second technique is a display control method including: controlling display, on a display unit, of highlighting corresponding to a state of an image depending on an in-focus state of a subject in the image being within a predetermined in-focus near range.

Moreover, a third technique is a display control program causing a computer to execute a display control method including controlling display, on a display unit, of highlighting corresponding to a state of an image depending on an in-focus state of a subject in the image being within a predetermined in-focus near range.

Advantageous Effects of Invention

According to the present technology, it is possible to perform optimum peaking regardless of subjects, shooting conditions, or the like. Moreover, the effect described above is not necessarily limitative and may be any effect described in this specification.

BRIEF DESCRIPTION OF DRAWINGS

FIG. 9 is a flowchart illustrating a procedure of the peaking processing according to the third embodiment.

MODE(S) FOR CARRYING OUT THE INVENTION

Embodiments of the present technology are described below with reference to the drawings. Moreover, the description is given in the following order.
<1. First Embodiment>
[1-1. Configuration of Image Capturing Device]
[1-2. Peaking Processing]

<2. Second Embodiment>
[2-1. Peaking Processing]
<3. Third Embodiment>
[3-1. Peaking Processing]
<4. Modified Example>

1. First Embodiment

[1-1. Configuration of Image Capturing Device]

Figure 1:
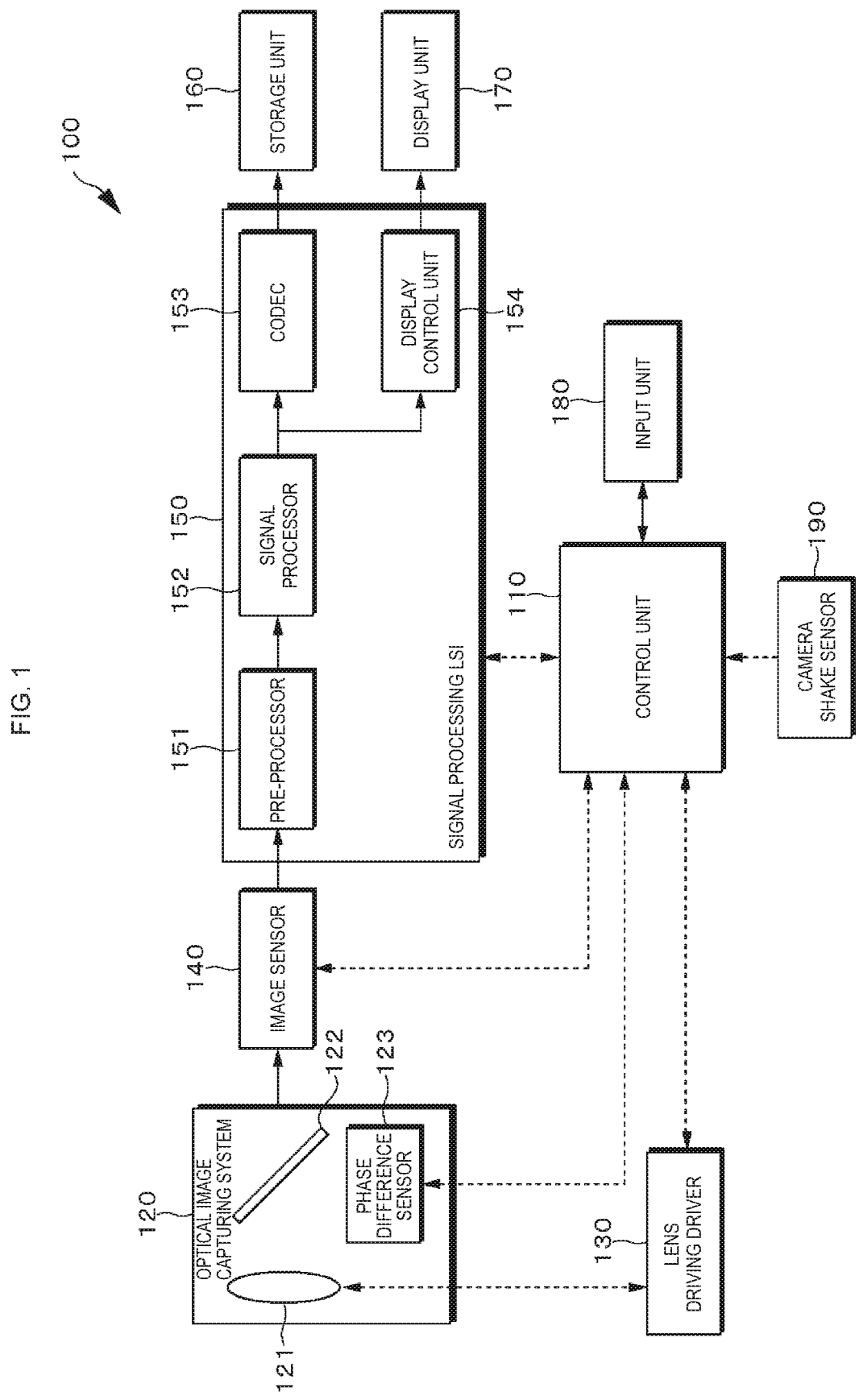
FIG. 1 is a block diagram illustrating a configuration of an image capturing device according to the present technology.

The configuration of an image capturing device 100 equipped with functions of a display control device according to a first embodiment is now described. FIG. 1 is a block diagram illustrating the configuration of the image capturing device 100.

The image capturing device 100 includes a control unit 110, an optical image capturing system 120, a lens driving driver 130, an image sensor 140, a signal processing large-scale integration (LSI) 150, a pre-processor 151, an image signal processor 152, a codec 153, a display control unit 154, a storage unit 160, a display unit 170, an input unit 180, and a camera shake sensor 190.

The control unit 110 includes a central processor (CPU), a random-access memory (RAM), a read-only memory (ROM), or the like. The ROM stores a program or the like that is read and operated by the CPU. The RAM is used as a work memory of the CPU. The CPU executes various kinds of processing in accordance with a program stored in the ROM and issues a command to control the entire image capturing device 100.

The optical image capturing system 120 includes a lens 121, a half mirror 122, and a phase difference sensor 123. The lens 121 is used to condense light from a subject on the image sensor 140. The half mirror 122 is used to guide light incident through the lens 121 to the image sensor 140 and the phase difference sensor 123. The phase difference sensor 123 is a sensor for auto focus (AF) based on phase difference detection. In the present technology, the phase difference sensor 123 acquires a focus evaluation value and an in-focus state is determined using this focus evaluation value. In addition, the optical image capturing system 120 is configured to further include, in one example, a driving mechanism, a shutter mechanism, and an iris mechanism, which are used to move the photographic lens 121 to perform focusing and zooming. In the present technology, the focus evaluation value refers to the radius of the magnitude of blur in an image, and the magnitude of the blur is represented in pixel units. The blur refers to a portion or state that is out of focus and blurred in an image. In addition, the magnitude of blur refers typically to the magnitude of spreading of an image (point spread function: PSF, or point spread characteristics) on an image capturing surface when the lens forms an image of a subject of a point light source. In addition, the best focus condition refers to a condition that the diameter of the PSF becomes the minimum, and at this time, the lens forms the sharpest image. In addition, the in-focus state refers to a state in which the PSF is less than a permissible circle of confusion. The permissible circle of confusion circle diameter refers to the maximum diameter of blur that an end viewer fails to perceive the occurrence of blur in considering a system from image capturing to viewing.

The lens 121 is a lens for condensing light from a subject on the image sensor 140. The optical image of a subject, which is obtained through the lens 121, is guided toward the image sensor 140 by the half mirror 122 and is formed on the image sensor 140.

The lens driving driver 130 is composed of, in one example, a microcomputer or the like, and controls operations of the driving mechanism, the shutter mechanism, the iris mechanism, or the like of the optical image capturing system 120 under the control of the control unit 110. This allows exposure time (shutter speed), aperture value (F-number), or the like to be adjusted. In addition to the focus evaluation value from the phase difference sensor 123, the position information of the lens 121 that is obtained from the lens driving driver 130 is also possible to be used for determining the in-focus state.

The image sensor 140 photoelectrically converts incident light from a subject into electric charge and outputs it as an analog image capturing signal. The analog image capturing signal is output from the image sensor 140 to the pre-processor 151. An example of the image sensor 140 includes charge-coupled device (CCD), complementary-metal-oxide semiconductor (CMOS), or the like. Moreover, the image sensor 140 may be equipped with the function of the phase difference sensor 123.

The pre-processor 151 performs sample-and-hold processing or the like on the image capturing signal that is output from the image sensor 140 so that a satisfactory signal-to-noise (S/N) ratio may be maintained by correlated double sampling (CDS) processing. Furthermore, the gain is controlled by auto gain control (AGC) processing, and analog-to-digital (A/D) conversion is performed to output a digital image signal.

The image signal processor 152 performs predetermined signal processing such as demosaic processing, white balance adjustment processing, color correction processing, gamma correction processing, Y/C conversion processing, auto exposure (AE) processing, and resolution conversion processing, on the image signal.

The codec 153 performs, in one example, coding processing for recording or communication on the image data that is subjected to the predetermined processing.

The display control unit 154 acquires a focus evaluation value from the phase difference sensor 123, and adjusts and sets a peaking threshold serving as a threshold for highlighting on the basis of the acquired focus evaluation value. The adjustment of the peaking threshold will be described later in detail. In addition, the display control unit 154 performs highlighting using the peaking processing on the basis of the peaking threshold that is set when the energy of the high frequency component for each pixel in an image exceeds the peaking threshold. This peaking processing is performed by high frequency component extraction processing, comparison processing, and peaking rendering processing. The high frequency component extraction processing extracts a high frequency component by a high-pass filter having a predetermined filter factor, and the comparison processing compares the energy of the extracted high frequency component with the peaking threshold. The peaking rendering processing highlights a pixel at a location corresponding to information on position of a pixel in which the energy of the high frequency component is determined to be more than the peaking threshold by comparison. The peaking processing allows a focused subject in an image to be highlighted. This makes it possible the user to perform focusing easily by performing focusing so that more peaking markers are rendered.

Moreover, the focus evaluation value may be supplied from the phase difference sensor 123 to the display control unit 154 via the control unit 110 or may be directly supplied from the phase difference sensor 123 to the display control unit 154.

The display control unit 154 may be configured as a program. This program may be installed in the image capturing device 100 in advance, or may be delivered using downloading, a storage medium, or the like and installed by the user himself. The control unit 110 may execute the program so that the control unit 110 functions as the display control unit 154. Moreover, the display control unit 154 may be implemented not only by a program but also by a combination of dedicated devices, circuits, or the like with hardware having the above function.

The storage unit 160 is a high capacity storage medium such as a hard disk, Memory Stick (registered trademark of Sony Corporation), and SD memory card. The image is stored, in one example, in a compressed state using the standard such as Joint Photographic Experts Group (JPEG). In addition, exchangeable image file format (Exif) data including information on a stored image and additional information such as shooting date and time is also stored in association with the image. The moving image is saved in a format such as Moving Picture Experts Group2 (MPEG2), MPEG 4, or the like.

The display unit 170 is a display device composed of, in one example, a liquid crystal display (LCD), a plasma display panel (PDP), an organic electro luminescence (EL) panel, or the like. On the display unit 170, a user interface, a menu screen, and a monitoring image being captured of the image capturing device 100, a captured image and a captured moving image recorded in the storage unit 160, or the like are displayed.

The input unit 180 includes, in one example, a power button for switching power on/off, a release button for instructing the start of recording of a captured image, an operating tool for zoom adjustment, a touch screen integrally formed with the display unit 170, or the like. When the input unit 180 receives an input, a control signal corresponding to the input is generated and is output to the control unit 110. Then, the control unit 110 performs arithmetic processing and control corresponding to the control signal.

The camera shake sensor 190 detects camera shake while shooting, in one example, by an acceleration sensor or an angular velocity sensor in two axial directions, and supplies camera shake information to the control unit 110. The control unit 110 performs camera shake correction control on the basis of the camera shake information from the camera shake sensor.

The image capturing device 100 equipped with a function as the display control device is configured as described above.

[1-2. Peaking Processing]

The peaking processing performed in the image capturing device 100 is now described. An overview of peaking is described with reference to FIGS. 2A, 2B, 2C and 2D. Peaking is processing of detecting a high frequency component in an image, specifying an in-focus portion of a subject, and highlighting pixels constituting an edge portion (e.g., pattern or contour) of the subject. The pixels constituting the edge portion are rendered with a marker of a predetermined color, and so the pixels are highlighted by increasing the line along the edge portion of the subject or by thickening the line along the contour of the subject. In addition, it may be performed by changing the luminance or color tone of a pixel, or superimposing a signal for highlighting on the pixel. The luminance and color tone of a pixel other than the pixel to be highlighted may be relatively reduced so that the pixel other than the pixel to be highlighted is displayed by blurring. The display mode is not limited to a particular method as long as the pixel to be highlighted can be distinguished from other pixels.

Figure 2B:
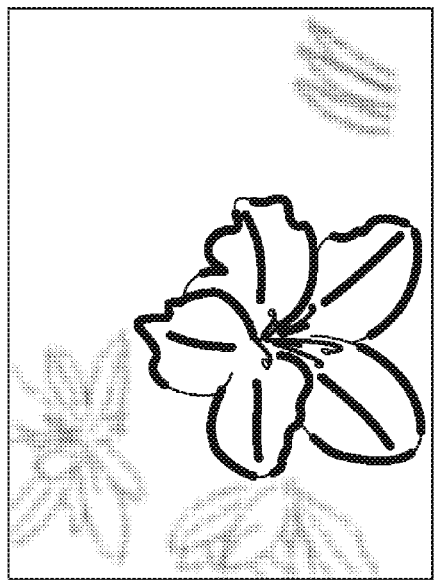
FIGS. 2A, 2B, 2C and 2D are diagrams illustrated to describe an overview of peaking processing.
Figure 2D:
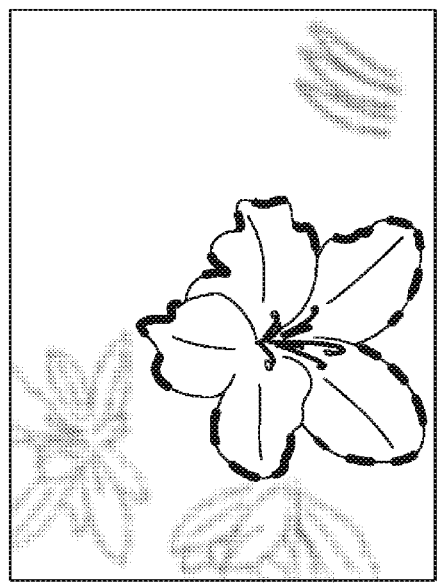
Figure 2A:
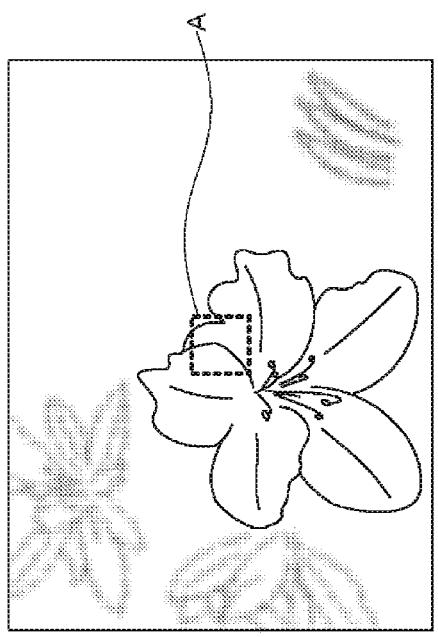

FIGS. 2A, 2B, 2C and 2D illustrate examples of images constituting a monitoring image to be subjected to the peaking processing. In FIG. 2A, a frame A, which is indicated by a broken line and superimposed on an image, is an area to be detected by the phase difference sensor 123. FIG. 2B illustrates an example in which the peaking processing is performed by setting an appropriate peaking threshold for the image. It is possible to show a flower as a subject, which is in focus, to the user by depicting a peaking marker on pixels constituting the image and drawing a thick line along the entire contour of the flower.

Figure 2C:
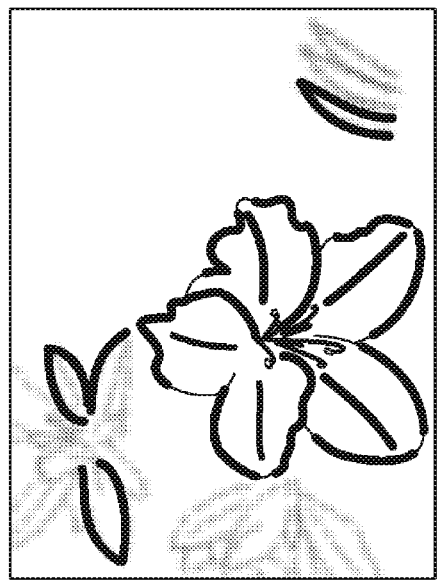

FIG. 2C illustrates a case where the peaking processing is performed on the image and the peaking threshold is set to be low unsatisfactorily. In this case, the peaking marker is depicted on pixels constituting the image, and the thick lines along the contours of objects constituting the blurred background as well as the flower as a main subject are represented. Thus, it fails to show appropriate focusing to the user.

FIG. 2D illustrates a case where the peaking processing is performed on the image and the peaking threshold is set to be high unsatisfactorily. In this case, a peaking marker does not appear at the portion where contrast is low in the flower serving as the main subject in the image, so it fails to show appropriate focusing to the user. Thus, in the peaking processing, it is important to set an appropriate peaking threshold.

Next, the procedure of the peaking processing in the first embodiment is described with reference to the flowchart of FIG. 3. First, in step S11, the display control unit 154 acquires a focus evaluation value in images constituting the monitoring image to be processed from the phase difference sensor 123. As described above, the focus evaluation value is a value that represents blur in the image, and in one example, represents the radius of the magnitude of the PSF in pixel units. As the magnitude of blur is smaller, the subject is more in focus. Next, in step S12, the display control unit 154 calculates an adjustment factor from the focus evaluation value. The adjustment factor is a coefficient used to set the peaking threshold depending on the proximity to a focus best condition indicated by the focus evaluation value. A method of calculating the adjustment factor is described below.

Figure 4:
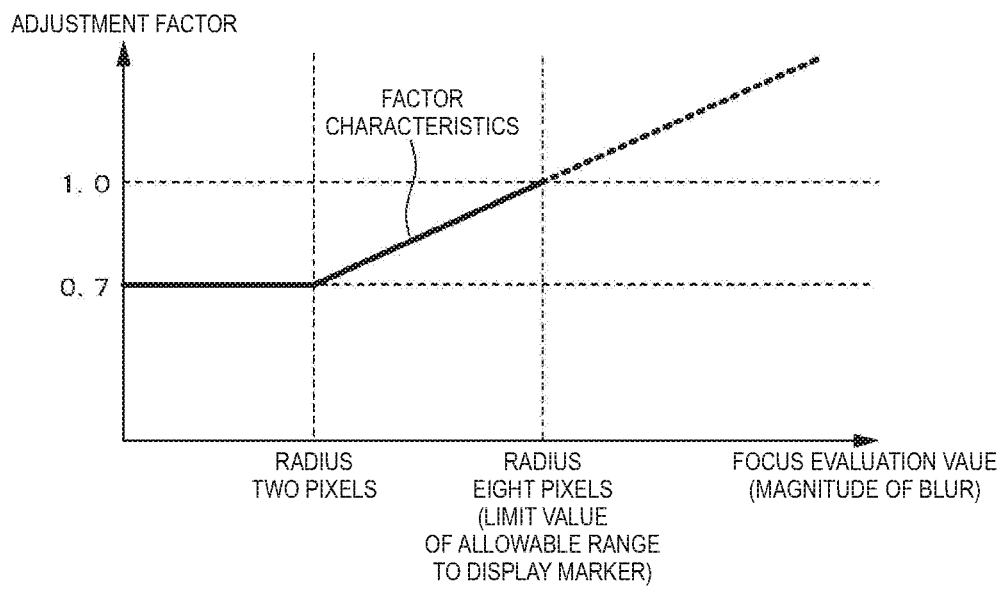
FIG. 4 is a diagram illustrated to describe settings of a peaking threshold.

FIG. 4 is a graph illustrating the relationship between the adjustment factor used to set the peaking threshold and the focus evaluation value. In the graph, the vertical axis represents the adjustment factor and the horizontal axis represents the magnitude of blur in pixel units, which is indicated by the focus evaluation value. In the graph, factor characteristics, which are used to determine the adjustment factor from the focus evaluation value, is indicated by a line segment.

The factor characteristics are set so that the adjustment factor increases as the focus evaluation value increases. In addition, in the example shown in the graph of FIG. 4, the factor characteristics are set so that the adjustment factor is fixed at 0.7 in a range where the magnitude of blur that is indicated by the focus evaluation value is two pixels or less. This is the lower limit of the adjustment factor to reduce noise in the focus evaluation value. The lower the adjustment factor, the lower the peaking threshold, and so the peaking marker tends to increase but tends to depend on noise. Thus, it is intended to prevent the peaking threshold from being less than a predetermined value. In addition, these two pixels correspond to limit values determined by the detection performance of the magnitude of blur that is obtained from the phase difference sensor. When the focus point at which the high frequency component in the image has the maximum energy comes close to the in-focus state, the S/N of the focus evaluation value decreases due to the performance and detection accuracy of the phase difference sensor 123, which leads to impairment of stability of values. This is the limit of the focus information obtained by the phase difference sensor 123.

Further, the factor characteristics are set so that the adjustment factor increases linearly as the magnitude of blur indicated by the focus evaluation value increases from two to eight pixels. Then, the factor characteristics are set so that the adjustment factor is 1.0 when the focus evaluation value is eight pixels. These eight pixels indicate the limit value of the range where the user is allowed to indicate the peaking marker, and correspond to the predetermined value of the focus evaluation value in the claims. In a case where the magnitude of blur is equal to or more than the limit value of this allowable range, it is determined that the main subject in the image is out of focus at all and so the peaking processing is not performed. In a case where the magnitude of blur is equal to or less than the predetermined value, the peaking processing is performed assuming that the subject is in focus.

The peaking threshold is calculated by multiplying the maximum value of a high frequency component within an area detected by the phase difference sensor 123 (hereinafter referred to as a phase difference sensor detection area) in the image by the adjustment factor. The peaking processing is performed in the case where the maximum value of the high frequency component in the image is equal to or more than the peaking threshold. In a case where the adjustment factor is a value of 1 or more, the peaking threshold is more than the maximum value of the high frequency component within the phase difference sensor detection area. Then, the pixel detected by the peaking processing disappears and the peaking threshold does not substantially function, thus it is desirable to set the factor characteristic so that the adjustment factor is 1 at the allowable limit value of the magnitude of blur indicated by the focus evaluation value.

Moreover, the specific values of eight pixels or two pixels, which are the magnitude of blur and the adjustment factor of 0.7 as the focus evaluation value in the graph of FIG. 4, are merely examples, and the values are not limited to these values. The value of a pixel that is the magnitude of blur also varies depending on types of a camera, the size of an image, or the like.

Figure 3:
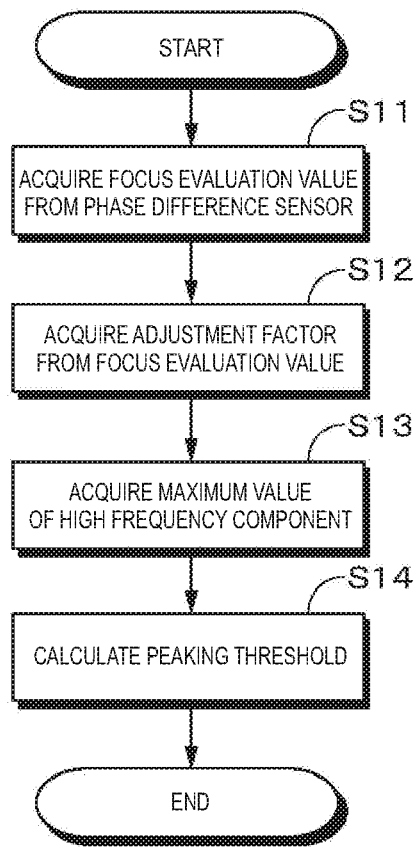
FIG. 3 is a flowchart illustrating a procedure of peaking processing according to a first embodiment.

Referring back to the description of the flowchart of FIG. 3, in step S13, the display control unit 154 acquires the maximum value of a high frequency component in the phase difference sensor detection area in the image. Moreover, the maximum value of the high frequency component is not necessarily a value within substantially the same range as the phase difference sensor detection area, and may be a value in a wider range than a phase difference sensor detection area including the phase difference sensor detection area therein. The maximum value of the high frequency component in the phase difference sensor detection area is obtainable from, in one example, a histogram of the frequency of the image. In addition, in one example, in autofocus mode, the high frequency component is obtainable as a numerical value, so the acquisition of the numerical value makes it possible to obtain the maximum value of the high frequency component.

Then, in step S14, the display control unit 154 calculates a peaking threshold by multiplying the maximum value of the high frequency component by the adjustment factor. This calculated peaking threshold is set as a threshold used for the peaking processing, and highlighting by the peaking processing is performed in the case where the energy of the high frequency component for each pixel in the image exceeds the peaking threshold.

Figure 5A:
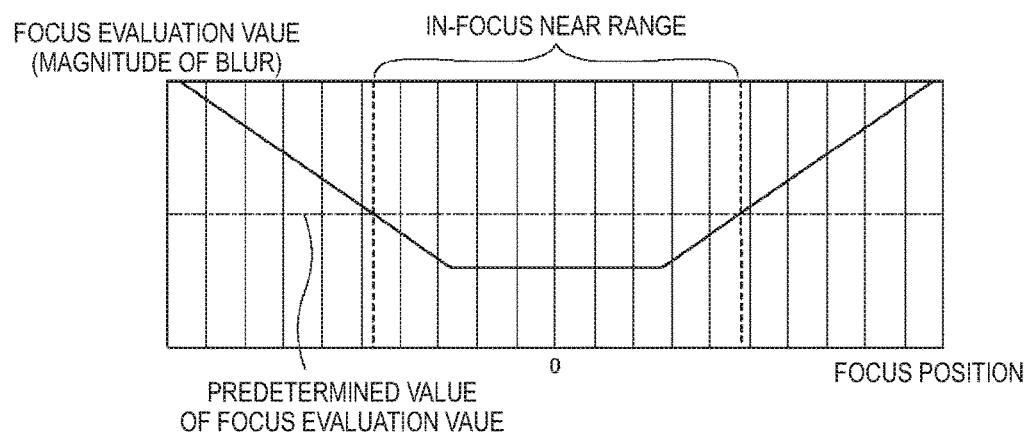
FIGS. 5A, 5B, and 5C are diagrams illustrated to describe the peaking processing according to the first embodiment.
Figure 5B:
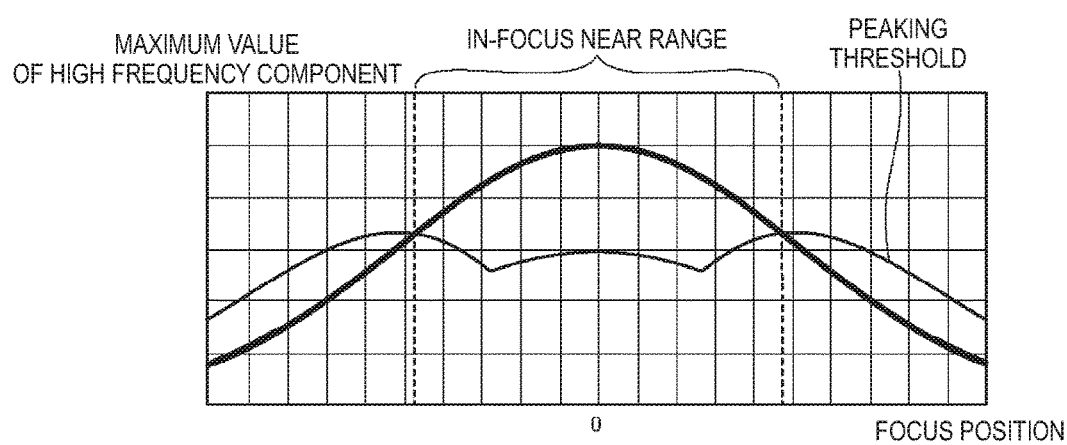
Figure 5C:
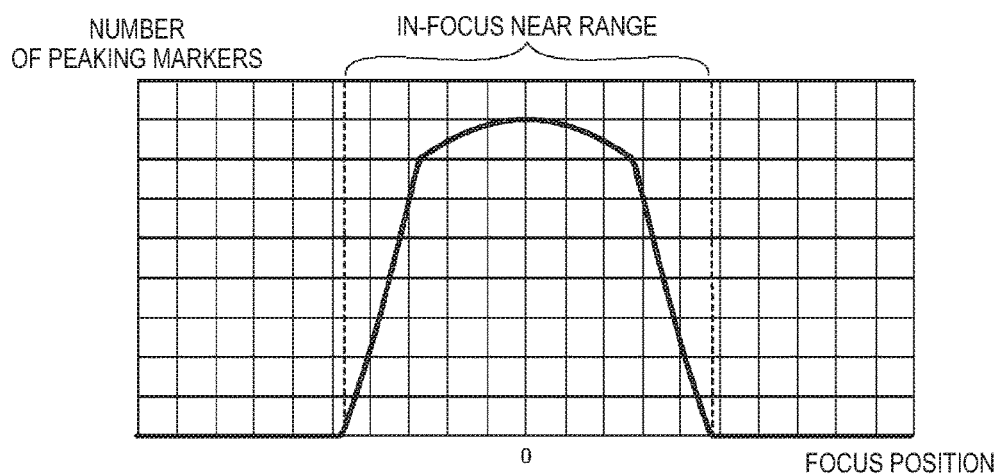

Next, an operation of the peaking processing in the first embodiment is described with reference to FIGS. 5A, 5B and 5C. FIG. 5A illustrates a variation of focus evaluation values with a change in focus positions, and the vertical axis represents the focus evaluation value. FIG. 5B illustrates the high frequency component and the peaking threshold in the image, and the vertical axis represents the maximum value of the high frequency component in the phase difference sensor detection area. In FIG. 5B, the thick line represents the high frequency component in the image, and the thin line represents the peaking threshold. FIG. 5C illustrates the number of peaking markers within an in-focus near range, and the vertical axis represents the number of peaking markers in the phase difference sensor detection area. In FIGS. 5A, 5B, and 5C, the horizontal axis represents the amount of deviation from the best focus position, and "0" on the horizontal axis represents the best focus position.

In FIGS. 5A, 5B, and 5C, a range sandwiched between a pair of broken lines indicates the in-focus near range. In the present technique, the in-focus near range includes a focus position in which high frequency components in the image have the maximum energy, and the in-focus near range is a range where the magnitude of blur in the image indicated by the focus evaluation value is a predetermined value or less. In the case where the in-focus state is within the in-focus near range, it can be said that the fact that the focus is near the in-focus range is known from the focus evaluation value by the phase difference sensor 123. In addition, the focus evaluation value indicates the magnitude of blur in the image, so the decrease in the focus evaluation value indicates an approach within the in-focus near range, that is, the focus matches the subject. In the case where the in-focus state is within the in-focus near range, highlighting is performed using the peaking marker, so it is possible for the user to easily focus on the position having the highest energy of the high frequency component in the image.

As illustrated in FIG. 5A, there may be a case where the focus is adjusted, the magnitude of blur in the image that is indicated by the focus evaluation value decreases, and the focus is close to a focus position having the highest energy of the high-frequency component in the image within the in-focus near range. In this case, the focus evaluation value has an error depending on the performance and detection accuracy of the phase difference sensor 123, which leads to the decrease in reliability of the value. This refers to a state, in one example, where the focus evaluation value described with reference to FIG. 4 reaches two pixels.

In FIG. 5A, the alternate long and short dash lines represent a predetermined value of the focus evaluation value, and the predetermined value indicates the limit value of the allowable range of the magnitude of blur indicated by the focus evaluation value. This corresponds to eight pixels in FIG. 4. Thus, two points where the line segment indicating the focus evaluation value intersects the limit value of the allowable range of the focus evaluation value are both ends of the in-focus near range. As described above, the in-focus near range is determined using the focus evaluation value from the phase difference sensor 123.

As described above, the peaking threshold is calculated by multiplying the maximum value of the high frequency component by the adjustment factor. The adjustment factor is a value of 1 or more outside the in-focus near range, so the peaking threshold is more than the maximum value of the high frequency component outside the in-focus near range as illustrated in FIG. 5B. As long as the peaking threshold is more than the high frequency component, the peaking marker is not displayed and highlighting is not performed.

On the other hand, when the focus evaluation value is a value equal to or less than the limit value of the allowable range, the adjustment factor becomes a value of 1 or less, so the peaking threshold is less than the maximum value of the high frequency component within the in-focus near range as illustrated in FIG. 5B. This allows the peaking marker to be tend to increase in the in-focus near range around the focus position where the high frequency component in the image has the maximum energy, and as illustrated in FIG. 5C, the peaking marker appears within the in-focus near range. The decrease of the peaking threshold increases the maximum value of the high frequency component that is equal to or more than the peaking threshold, so the number of appearing peaking markers increases. Then, the number of peaking markers increases as approaching the maximum value of the high frequency component, but the number of peaking markers decreases as deviating from the maximum value of the high frequency component.

In this manner, the in-focus near range is determined using the focus evaluation value from the phase difference sensor 123, and the peaking marker is displayed only within the in-focus near range. Thus, it is possible to display typically the peaking marker only within the in-focus near range around the focus position at which the high-frequency component in the image has the maximum energy, without adjusting settings for peaking processing such as peaking threshold, regardless of subject type or shooting conditions.

The first embodiment allows the peaking threshold to be determined automatically so that the peaking marker appears in the in-focus near range serving as the range in which the fact that the focusing is achieved to some extent using the focus evaluation value by the phase difference sensor 123 is detected. This appearance of the peaking threshold is based on the focus evaluation value, regardless of subject type or shooting conditions. In addition, the peaking processing is performed within the in-focus near range regardless of whether the contrast of a subject is high or low. Thus, it is possible to implement the processing of typically displaying the peaking marker within the in-focus near range using simple processing without adjusting settings for the peaking processing.

2. Second Embodiment

Next, a second embodiment of the present technology is described. Moreover, the configuration of the image capturing device 100 is similar to that of the first embodiment, so the description thereof is omitted. The second embodiment changes settings of the peaking threshold depending on whether the in-focus state is within the in-focus near range or outside of the in-focus near range, and further maintains the peaking threshold at a fixed value within the in-focus near range.

[2-1. Peaking Processing]

Figure 6:
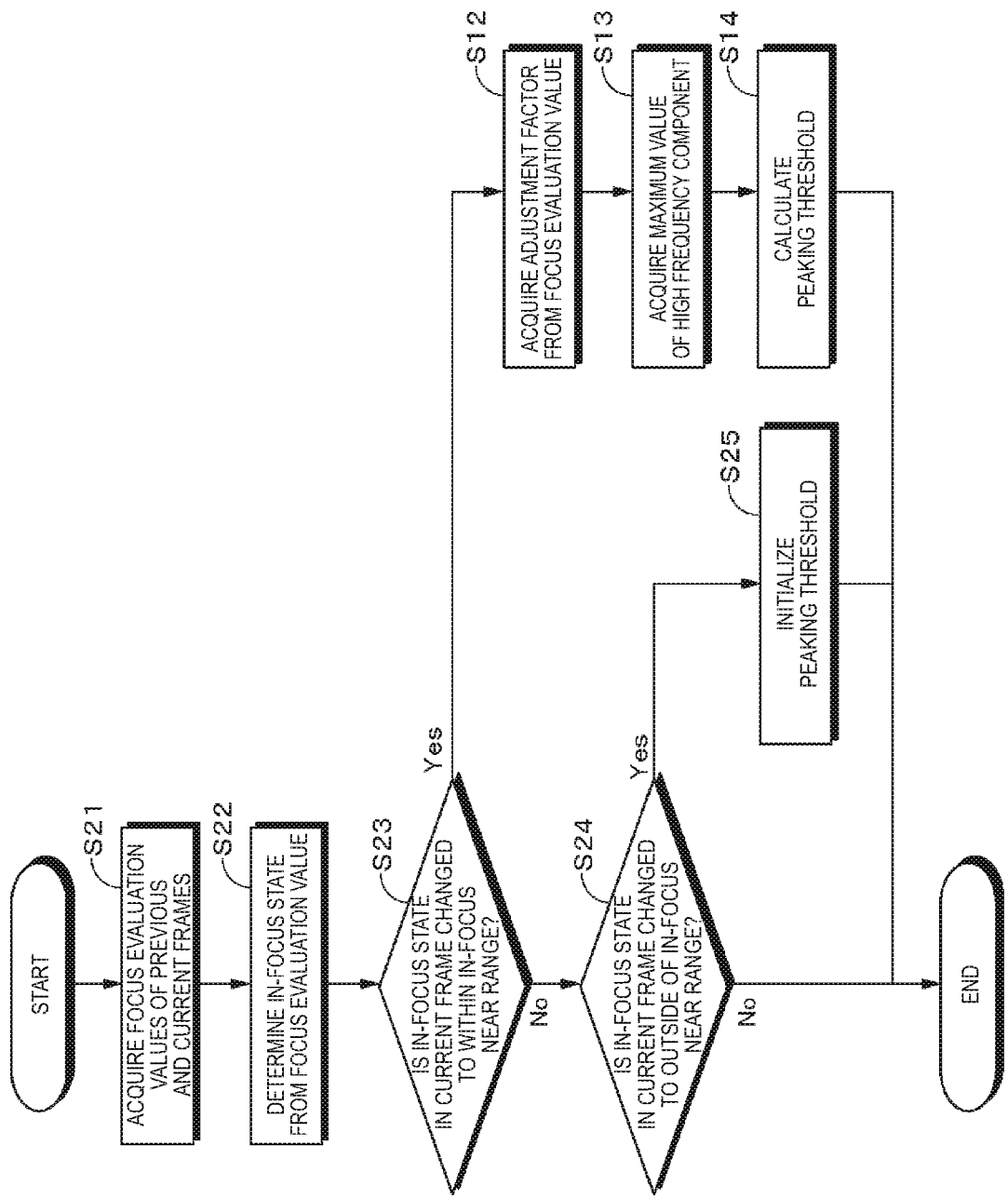
FIG. 6 is a flowchart illustrating a procedure of peaking processing according to a second embodiment.

The procedure of the peaking processing according to the second embodiment is described with reference to the flowchart of FIG. 6. Moreover, the same procedure step number denotes processing similar to that in the flowchart of the first embodiment.

First, in step S21, a focus evaluation value in each of a current frame image (hereinafter referred to as a current frame) constituting a monitoring image to be processed and a frame image immediately preceding temporally the current frame (hereinafter referred to as a previous frame) is acquired from the phase difference sensor 123. Moreover, the focus evaluation value acquired in the previous frame may be stored in a memory or the like and then the focus evaluation value in the current frame may be acquired.

Next, in step S22, the in-focus state is determined from the focus evaluation value. The determination of the in-focus state is performed by determining whether the focus position is within the in-focus near range or outside of the in-focus near range. The determination of the in-focus state from the focus evaluation value can be performed by determining whether the magnitude of blur indicated by the focus evaluation value is equal to or less than a predetermined value. This predetermined value indicates the limit value of the allowable range to display the marker indicated by the focus evaluation value. In a case where the magnitude of blur is equal to or less than a second predetermined value, a main subject is in focus and it is subjected to the highlighting processing by the peaking marker. In the case where the magnitude of blur is equal to or less than the predetermined value, the in-focus state is within the in-focus near range. However, in a case where the magnitude of blur is equal to, or more than, the predetermined value, the in-focus state is outside of the in-focus near range.

Next, in step S23, it is determined whether the in-focus state is outside of the in-focus near range in the previous frame and the in-focus state is within the in-focus near range in the current frame. In a case where the in-focus state when proceeding from the previous frame to the current frame is changed from outside of the in-focus near range to within the in-focus near range, the processing proceeds to step S12 (Yes in step S23). Moreover, the previous frame does not exist in a first frame, and so the in-focus state of the previous frame is treated as undefined. This allows the determination of whether there is a change from outside of the in-focus near range to within the focusing near range to be Yes.

Next, in step S12, the display control unit 154 calculates the adjustment factor from the focus evaluation value. The adjustment factor is calculated in a similar manner to the first embodiment. Next, in step S13, the display control unit 154 acquires the maximum value of the high frequency component in the phase difference sensor detection area in the image. Then, in step S14, the display control unit 154 calculates the peaking threshold by multiplying the maximum value of the high frequency component by the adjustment factor, and sets the peaking threshold as a threshold used for the peaking processing. The highlighting by the peaking processing is performed on the basis of the peaking threshold in the case where the energy of the high frequency component for each pixel in the image exceeds the peaking threshold.

The description returns to step S23. If it is not determined in step S23 that the in-focus state when proceeding from the previous frame to the current frame is changed from outside of the in-focus near range to within the in-focus near range, the processing proceeds to step S24 (No in step S23). Next, in step S24, it is determined whether the in-focus state when proceeding from the previous frame to the current frame is changed from within the in-focus near range to outside of the in-focus near range. If it is determined that the in-focus state is changed from within the in-focus near range to outside of the in-focus near range, the processing proceeds to step S25 (Yes in step S24).

Then, in step S25, processing for returning the peaking threshold to the initial value is performed. This initial value is a value more than the maximum value of the high frequency component in the phase difference sensor detection area. By setting the peaking threshold to be a value more than the maximum value of the high frequency component, peaking is not performed outside the in-focus near range, so the peaking marker does not appear. This allows the peaking marker to appear only within the in-focus near range, and it is easier for the user to focus using peaking.

On the other hand, if it is not determined in step S24 that the in-focus state is changed from within the in-focus near range to outside of the in-focus near range, the processing is terminated without performing new processing (No in step S24). If shooting continues, the processing is repeated again from step S21. The case where it is not determined in step S24 that the in-focus state is changed from within the in-focus near range to outside of the in-focus near range refers to one of a case where the in-focus state remains within the in-focus near range or a case where the in-focus state remains outside the in-focus near range. In other words, the peaking threshold remains without setting or initializing the peaking threshold.

Figure 7A:
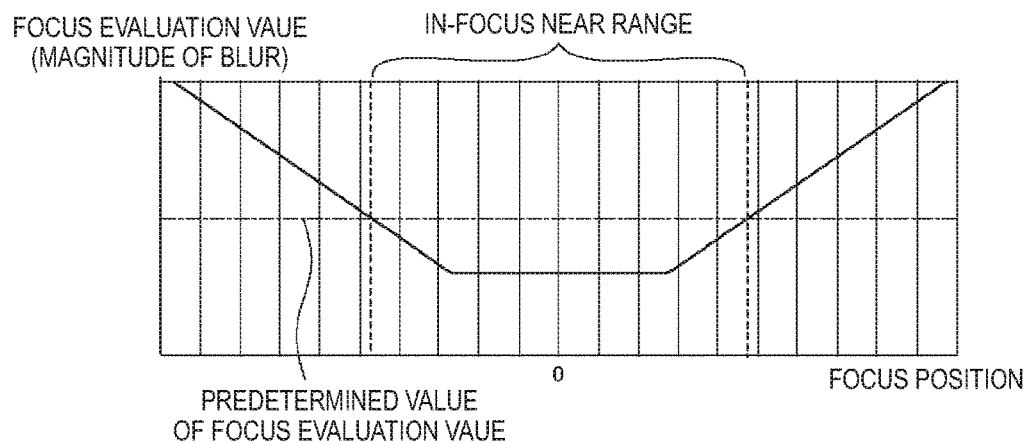
FIGS. 7A, 7B, and 7C are diagrams illustrated to describe the peaking processing according to the second embodiment.
Figure 7B:
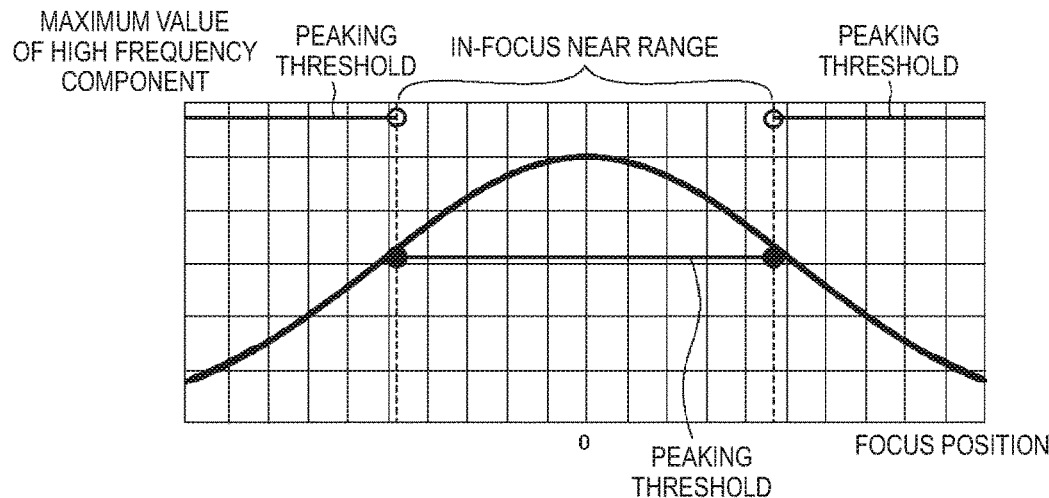
Figure 7C:
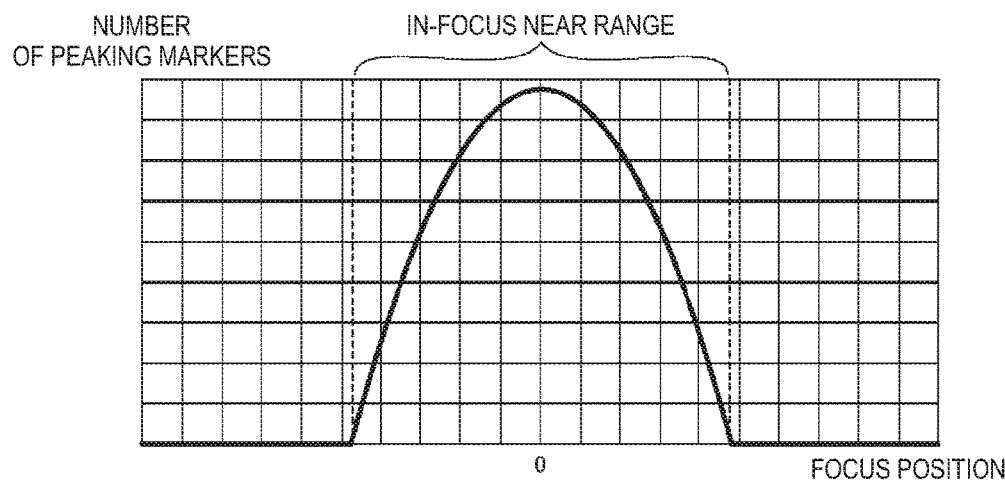

Next, an operation of the peaking processing in the second embodiment is described with reference to FIGS. 7A, 7B and 7C. FIG. 7A is a diagram similar to FIG. 5A in the first embodiment, and illustrates a variation of the focus evaluation value with the change in focus position. FIG. 7B is a diagram similar to FIG. 5B in the first embodiment, and illustrates the high frequency component and the peaking threshold in the image. In FIG. 7B, the thick line represents the high frequency component and the thin line represents the peaking threshold. FIG. 7C is a diagram similar to FIG. 5C in the first embodiment, and illustrate the number of peaking markers within the in-focus near range. In FIGS. 7A, 7B, and 7C, a range sandwiched between a pair of broken lines indicates the in-focus near range.

As described above in the description of the flowchart, in the second embodiment, a new peaking threshold is set in the case where the in-focus state is changed from outside of the in-focus near range to within the in-focus near range. Then, the peaking threshold remains as long as the in-focus state remains within the in-focus near range (continuing to exist within the in-focus near range), and the highlighting by the peaking processing is performed in the case where the energy of the high frequency component for each pixel in the image exceeds the peaking threshold.

Thus, as illustrated in FIG. 7B, even if the value of the high frequency component varies within the in-focus near range, there is no change in the peaking threshold. Thus, as illustrated in FIG. 5B of the first embodiment, the maximum value of the high frequency component is high around the focus position where the high frequency component in the image has the maximum energy, so there is no possibility that the peaking threshold is raised.

Thus, the number of peaking markers increases without decreasing the increase pace of the number of peaking markers near the focus position where the high frequency component in the image has the maximum energy as illustrated in FIG. 7C, as compared with the graph of FIG. 5C of the first embodiment. This makes it easy to recognize visually a change in the quantity of the peaking markers near the focus position where the high frequency component in the image has the maximum energy, so the user can more easily perform focusing.

In the case where the in-focus state is changed from within the in-focus near range to outside of the in-focus near range, the peaking threshold is initialized in step S25. Then, in the case where the in-focus state remains outside the in-focus near range, the processing from step S12 to step S14 is not performed, so the peaking threshold remains at the initial value regardless of the high frequency component. This prevents unnecessary peaking marker from being displayed in the case of deviating from the in-focus near range, so the user is more likely to concentrate on the focusing operation.

In the first embodiment, as illustrated in FIGS. 4 and 5A, when the focus evaluation value is fixed by clipping the focus evaluation value depending on the detection accuracy of the phase difference sensor 123, the adjustment factor also is fixed. Then, even when the adjustment factor is fixed, the maximum value of the high frequency component increases, so the peaking threshold is slightly larger in the clipped range. As the peaking threshold increases, the frequency of appearance of peaking markers decreases.

However, according to the second embodiment, it is possible to maintain typically the peaking threshold at a fixed value within the in-focus near range. Thus, the frequency of appearance of peaking markers does not decrease by increasing the peaking threshold, which has decreased within the in-focus near range, near the focus position where the high frequency component in the image has the maximum energy. This makes it easier to focus by using peaking.

3. Third Embodiment

Next, a third embodiment of the present technology is described. Moreover, the configuration of the image capturing device 100 is similar to that of the first embodiment, and so the description thereof is omitted. As illustrated by a plurality of frames surrounded by broken lines, which are superimposed on the image in FIG. 8A, the third embodiment differs from the first and second embodiment in that the phase difference sensor 123 has a detection area for the focus evaluation value by the plurality of phase difference sensors 123 in the image. In the example of FIG. 8A, there are 20 phase difference sensor detection areas in total of four vertical columns and five horizontal columns.

Figure 8B:
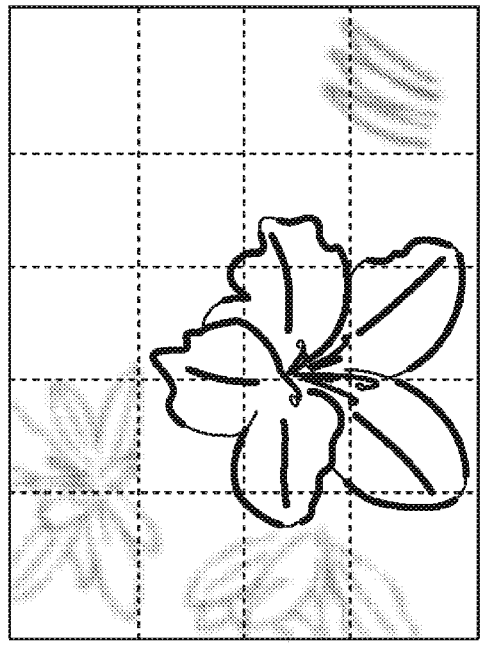
FIGS. 8A and 8B are diagrams illustrating an overview of peaking processing according to a third embodiment.
Figure 8A:
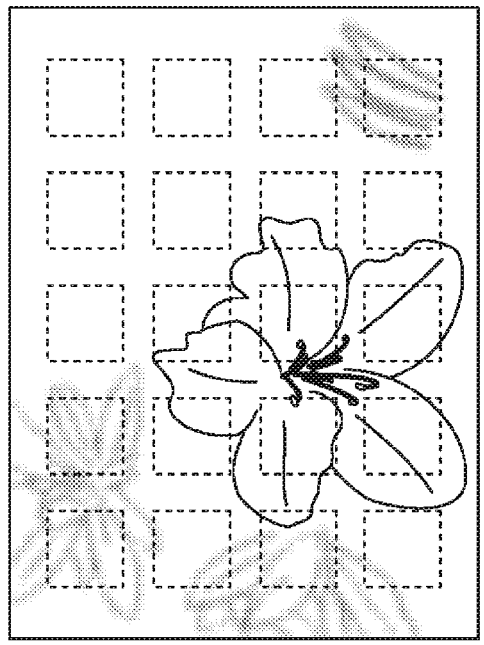

Furthermore, in the third embodiment, as illustrated by regions segmented by broken lines superimposed on the image in FIG. 8B, it is segmented into a plurality of regions so that each region corresponds to each of the plurality of phase difference sensor detection areas. Each of the plurality of regions has the peaking threshold, and the peaking processing is performed by setting the peaking threshold for each of the regions. Moreover, the number of phase difference sensor detection areas is merely an example, and it may be more or less than that number.

[3-1. Peaking Processing]

The procedure of the peaking processing according to the third embodiment is described with reference to the flowchart of FIG. 9. Moreover, the same procedure step number denotes processing similar to that in the flowchart of the first and second embodiments. In the processing of the flowchart illustrated in FIG. 9, steps S31 and S32 are performed for all the plurality of phase difference sensor detection areas existing in the image, and each step other than steps S31 and S32 is performed for one of the plurality of phase difference sensor detection areas.

First, in step S31, the focus evaluation value in each of the current frame constituting the monitoring image to be processed and in the previous frame, which is the frame immediately preceding the current frame, is acquired from the phase difference sensor 123. Next, in step S32, the in-focus state is determined from the focus evaluation value.

Next, in step S33, subjects in the phase difference sensor detection areas in the current frame constituting the monitoring image and the previous frame that is the temporally previous frame of the current frame are compared, and areas where the same subject is detected are associated with each other. Thus, the phase difference sensor detection area in the previous frame corresponding to one phase difference sensor detection area in the current frame is specified, and the focus evaluation values in one phase difference sensor detection area in the current frame and in the corresponding phase difference sensor detection area in the previous frame are associated with each other. This enables stable operation even when the position of the subject varies in the screen.

The comparison between the subjects in the phase difference sensor detection areas of the current frame and the previous frame can be performed using known subject recognition processing, matching processing, or the like. An example of the recognition method may include an object recognition technique based on template matching, a matching method based on luminance distribution information of a subject, and a method based on a skin color portion included in an image, a feature amount of a human face, or the like. In addition, these techniques may be combined to increase the accuracy of recognition.

Next, in step S34, it is determined whether the in-focus state when proceeding from the previous frame to the current frame is changed from outside of the in-focus near range to within the in-focus near range. In the case where it is changed from outside of the in-focus near range to within the in-focus near range, the processing proceeds to step S12 (Yes in step S34). Moreover, the previous frame does not exist in the first frame, so the in-focus state of the previous frame is treated as undefined. In addition, the in-focus state of the area that failed to associate is also treated as undefined. Thus, the determination of whether the in-focus state is changed from outside of the in-focus near range to within the in-focus near range is set to Yes.

Next, in step S12, the display control unit 154 calculates the adjustment factor from the focus evaluation value. Next, in step S13, the display control unit 154 acquires the maximum value of the high frequency component in the phase difference sensor detection area in the image. Then, in step S14, the display control unit 154 calculates a peaking threshold by multiplying the maximum value of the high frequency component by the adjustment factor, and sets the peaking threshold as the threshold used for the peaking processing. Then, the highlighting by the peaking processing is performed in the case where the energy of the high frequency component for each pixel in the image exceeds the peaking threshold.

The description returns to step S34. If it is not determined in step S34 that the in-focus state in the current frame is changed from outside of the in-focus near range to within the in-focus near range, the processing proceeds to step S35 (No in step S34). Next, in step S35, it is determined whether the in-focus state when proceeding from the previous frame to the current frame is changed from within the in-focus near range to outside of the in-focus near range. If it is determined that the in-focus state is changed from within the in-focus near range to outside of the in-focus near range, the processing proceeds to step S25 (Yes in step S35).

Then, in step S25, the processing for returning the peaking threshold to the initial value is performed. This processing is similar to that of step S25 in the second embodiment. This initial value is larger than the maximum value of the high frequency component in the phase difference sensor detection area. The peaking threshold, which is set to a value larger than the maximum value of the high frequency component, prevents the peaking processing being performed outside the in-focus near range and prevents the peaking marker from appearing. This allows the peaking marker to appear only in the case the in-focus state is within the in-focus near range, so it is easier for the user to focus using peaking.

On the other hand, if it is not determined in step S35 that the in-focus state is changed from within the in-focus near range to outside of the in-focus near range, the processing proceeds to step S36 (No in step S35). In the case where it is not determined in step S35 that the in-focus state is changed from within the in-focus near range to outside of the in-focus near range, the in-focus state when proceeding from the previous frame to the current frame remains within the in-focus near range or remains outside the in-focus near range.

In step S36, the peaking threshold used in one phase difference sensor detection area of the previous frame is set as the peaking threshold of the phase difference sensor detection area in the current frame corresponding thereto. This allows the peaking threshold to remain in both of one phase difference sensor detection area in the previous frame and a phase difference sensor detection area in the current frame corresponding thereto. When the energy of the high frequency component for each pixel in the image exceeds the peaking threshold, the highlighting by the peaking processing is performed.

If shooting continues, the processing is repeated again from step S33. The processing described above is processing for one of the plurality of phase difference sensor detection areas in the image. Then, this processing is performed for all phase difference sensor detection areas.

Figure 10B:
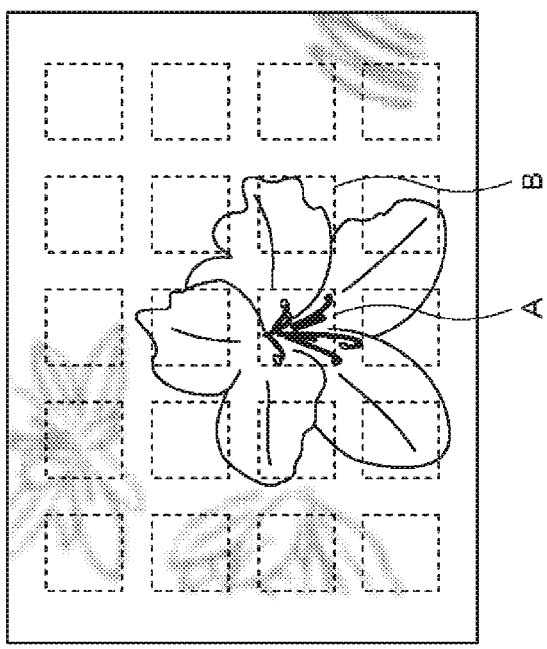
FIGS. 10A and 10B are diagrams illustrated to describe the peaking processing according to the third embodiment.
Figure 10A:
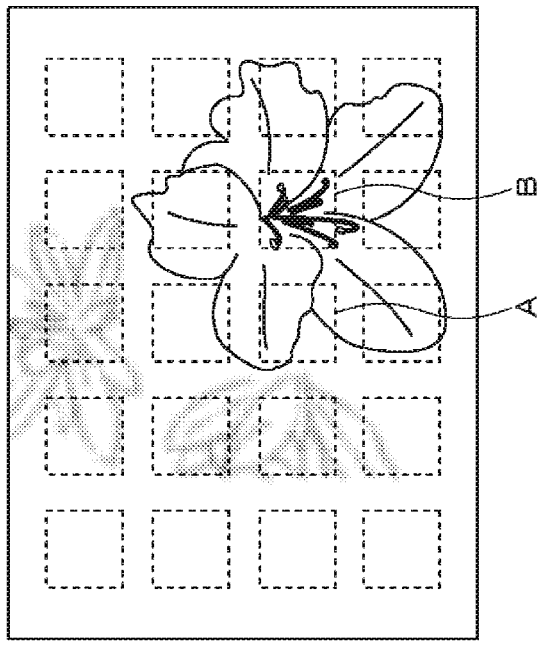

In one example, there may be a case where a subject moves or the camera shakes during focusing. In this case, the position of the subject may vary between the previous frame and the current frame. In FIGS. 10A and 10B, FIG. 10A illustrates an example of a previous frame, and FIG. 10B illustrates an example of a current frame. In the example of FIGS. 10A and 10B, due to the shaking of the camera, stamens of the flower are located in the phase difference sensor detection area A of the previous frame in FIG. 10A, but in the current frame shown in FIG. 10B, the position of the stamens of the flower are shifted and the stamens of the flower are located in the phase difference sensor detection area B. In this case, the subject in the phase difference sensor detection area A is changed between the previous frame and the current frame, and so when the phase difference sensor detection area A is compared between the previous frame and the current frame, the focus evaluation value does not correspond. If the focus evaluation value does not correspond, the peaking processing fails to be performed and setting of the appropriate peaking threshold is failed.

However, according to the third embodiment, the subjects in the phase difference sensor detection areas between the previous frame and the current frame are compared and the areas are associated with each other. Thus, in the example of FIGS. 10A and 10B, the focus evaluation values of the phase difference sensor detection area A and the phase difference sensor detection area B are associated with each other. This allows a series of processing to be performed in the phase difference sensor detection area A of the previous frame in FIG. 10A and the phase difference sensor detection area B of the current frame in FIG. 10B. Thus, even when the phase difference sensor 123 has a plurality of detection areas, the peaking threshold is appropriately set in the current frame for each of the plurality of areas, and the peaking processing is performed for each area.

4. Modified Example

Although the embodiments of the present technology are described in detail above, the present technology is not limited to the above-described embodiments, and various modifications based on the technical idea of the present technology are possible.

The characteristics for determining the adjustment factor may be adjusted or may be selected depending on the user's preference or the like. In one example, in a case where the necessary accuracy of focusing differs depending on the use of the image or the like, it is desirable to change the adjustment characteristics accordingly.

Figure 11A:
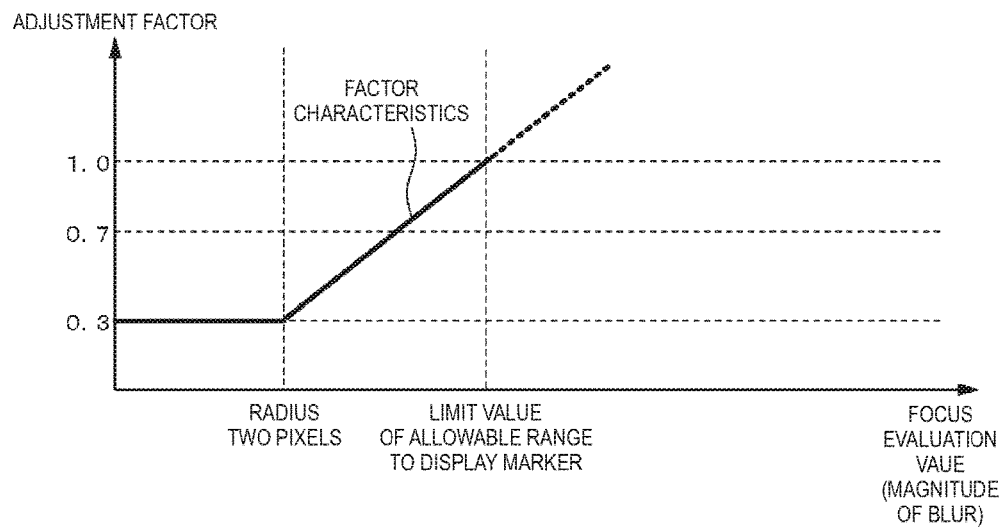
FIGS. 11A and 11B are diagrams illustrated to describe factor characteristics according to a modified example.
Figure 11B:
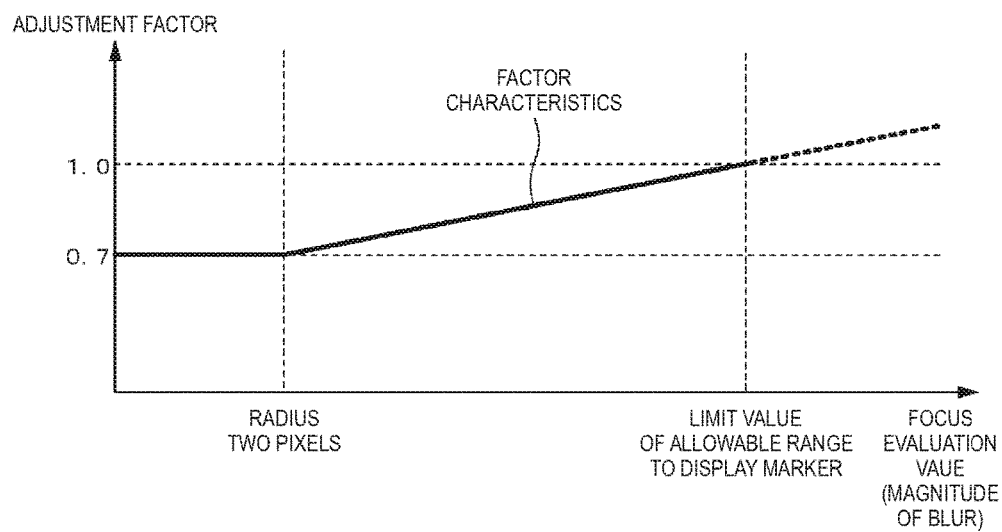

In one example, in the 4K resolution video system (hereinafter referred to as 4K) and the video graphics array (VGA), 4K has higher resolution and 4K is typically necessary to have focusing with higher accuracy than VGA. In this case, in 4K where high-accuracy focusing is necessary, the limit value of the allowable range of the magnitude of blur is less than the VGA, so the allowable range is narrow. Thus, the factor characteristics of 4K illustrated in FIG. 11A has a sharper inclination angle than the factor characteristics of VGA illustrated in FIG. 11B.

Furthermore, in the case of displaying an image with a high resolution in a large mode or printing it in a large mode, it is typically necessary that the camera is focused with high accuracy, the limit value of the allowable range of the magnitude of blur is small, and so the allowable range is narrow. Thus, the inclination angle of the factor characteristics becomes steep.

Further, a user with high shooting skills generally has high sensitivity to blurring due to out-of-focus and pursues more precise focusing. Thus, there is a tendency to prefer characteristics that the peaking response hardly occurs (characteristics having a narrow display allowable range of the peaking marker). In a case where such a user uses it, the limit value of the allowable range of the magnitude of blur indicated by the focus evaluation value is set to a small value, and the inclination angle of the characteristics for obtaining the adjustment factor is set to be large. If the limit value of the allowable range of the magnitude of blur is set to be a small value and the angle of the inclination of the characteristics is set to be large, the range of the in-focus near range is narrow and the peaking marker hardly appears.

Further, it is difficult to focus the moving image shooting as compared with the still image shooting, so it is considered that the peaking response is less likely to occur. In such a case, if the limit value of the allowable range of the phase difference sensor 123 is set to a small value and the inclination angle of the characteristics for obtaining the adjustment factor is made large as described above, the peaking marker hardly appears, and it can make the peaking response difficult.

Furthermore, under shooting conditions with a small exposure amount, noise easily occurs on the magnitude of blur indicated by the focus evaluation value. Thus, depending on the amount of noise, by increasing the lower limit of the adjustment factor as the noise increases, it is possible to make peaking response less likely occur to reduce the fluctuation of behavior.

The factor characteristics for determining the adjustment factor are not necessarily linear as illustrated in FIGS. 4 and 11, and the factor characteristics may be curve-like characteristics.

Further, the peaking threshold is calculated by multiplying the factor characteristics by the maximum value of the high frequency component in the embodiment, but other values of the high frequency component may be used. An example of other values includes an average value, an upper value (e.g., top 10%, etc.), or the like of high frequency components. The use of such a value allows the stability of the peaking processing to be increased.

Further, the peaking processing is performed by performing highlighting depending on the high frequency component in the embodiment. Alternatively, the peaking processing may be performed depending on the exposure. In this case, in one example, the peaking threshold may be set from the exposure value (EV) value and the adjustment factor, or the F-number of the lens 121, the shutter speed, or the like may be used.

Further, the peaking processing may be performed by performing highlighting depending on the specific state of a subject. The specific state of the subject is, in one example, a value indicating the brightness and roughness of the subject when the subject is a person. In this case, the value is compared with a predetermined value to determine the skin condition, and so the highlighting depending on the skin condition may be performed.

Techniques for focusing an image after shooting rather than during shooting are becoming widespread. In one example, it is possible to perform it by acquiring a series of image groups composed of a plurality of images with different focuses at the time of shooting and by selecting an image with a desired in-focus state from among the image groups using a personal computer or the like after shooting. In addition, there is also a technique for associating depth information called depth map with images and for using the depth map. Furthermore, there is a technique, which is called light field, for obtaining various focused images without changing the focus of the main lens by arranging a plurality of micro-lenses having different focuses on the front surface of the image sensor of the image capturing device and by reconstructing the focused image after shooting.

The present technology is applicable to techniques for focusing an image after shooting as described above. In one example, when acquiring a series of image groups composed of a plurality of images with different focuses, by further associating a focus evaluation value with information on a high frequency component for each image, it is possible to display the peaking marker by calculating the adjustment factor and the peaking threshold after shooting.

A technique, which is called light detection and ranging or laser imaging detection and ranging (LIDAR), for detecting scattered light by irradiating a laser emitting pulsed light and for calculating the distance from the reflection time (the time from emission to detection of reflected light) may be applicable to the present technology.

Further, a technique, which is called time of flight (ToF), for obtaining the traveling time (delay time) of the light until the light emitted from a light source is reflected by an object and reaches the sensor and for obtaining a distance to the subject from the speed of the light may be used.

In highlighting using the peaking marker, the color of the peaking marker may vary for each frame. In one example, serial numbers are allocated to all frames of a series of image groups constituting a monitoring image, and in one example, the peaking marker is set to be green for odd frames and to be red for even frames. The change in the color of the peaking marker for each frame makes it possible to prevent occurrence of a situation in which the peaking marker becomes similar color to the subject and the peaking is hard to distinguish.

Further, the user may optionally select the color of the peaking marker.

Furthermore, it is also possible to highlight the focused subject by techniques for changing or superimposing the luminance of the focused subject, for changing or superimposing the color of the subject, for reducing relatively the color tone of a subject other than the focused subject, or the like.

The easiness or difficulty of increasing the number of peaking markers can be made by adjusting the center frequency and/or the peak width of the peak of the high-pass filter for the high frequency component in the image on the basis of the focus evaluation value. In the case of a subject having a low high frequency component, peaking markers hardly appear in some cases even if the maximum value of the high frequency component is compared with the peaking threshold. In that case, the peaking marker may be easily increased by lowering the center frequency.

Further, in a case where the maximum value of the high frequency component falls below the predetermined value, the processing may be performed after increasing the maximum value of the high frequency component to a specific value. Further, if the peaking threshold is low unsatisfactorily (peaking marker is likely to increase), the peaking threshold tends to respond to noise, so the peaking threshold may be restricted so that the peaking threshold does not fall below the preset value.

Further, in order to be able to support even a smooth subject with a small high frequency component, a plurality of kinds of high-pass filters based on the peaking threshold are prepared, and a filter to be used among them may be determined when determining the adjustment factor.

There may be a case where a high frequency component does not appear depending on the type of the lens even if the image is in focus due to aberration around the image. Thus, the characteristics of the high-pass filter based on the peaking threshold may be changed depending on the type of the lens attached to the image capturing device.

Figure 12:
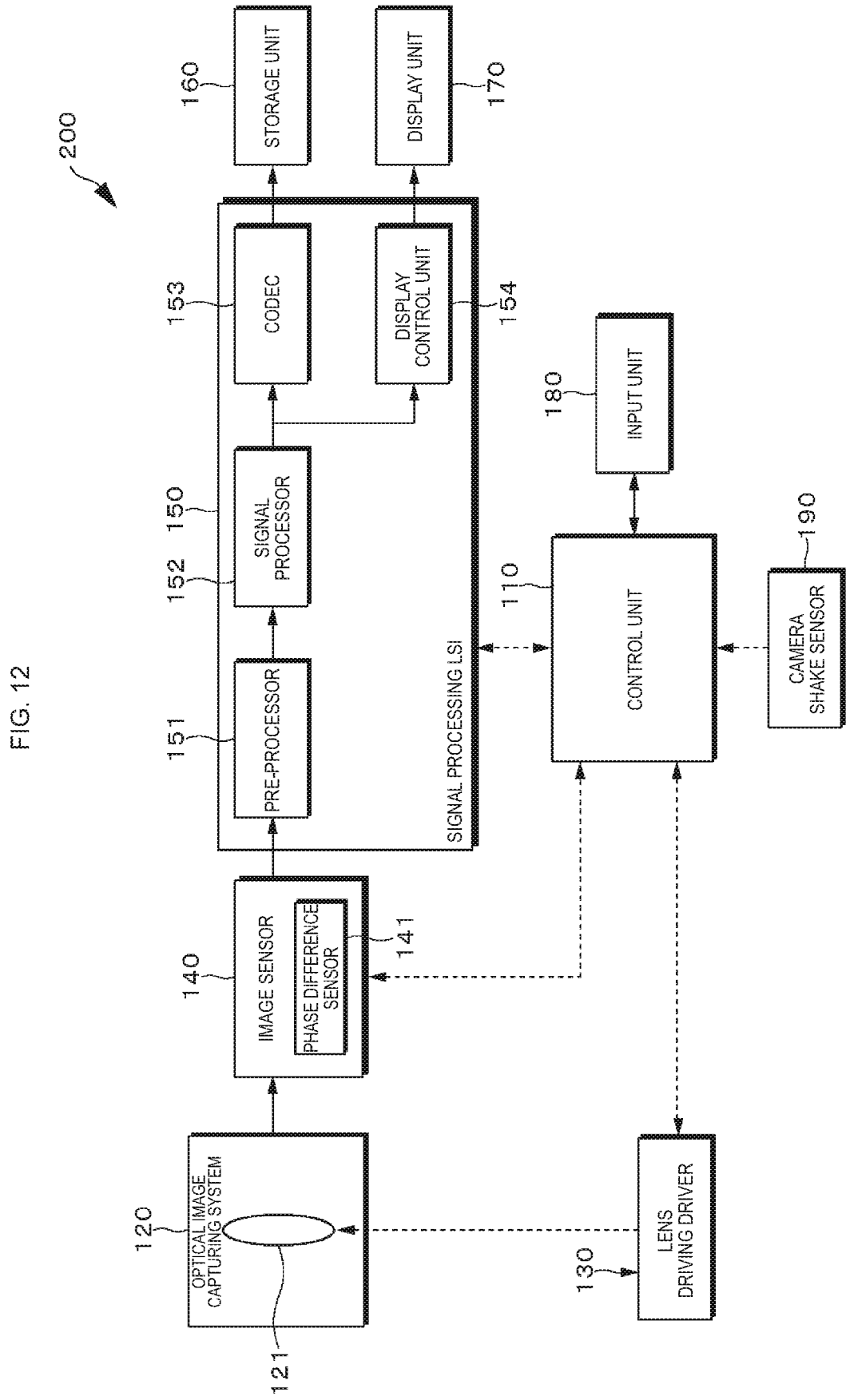
FIG. 12 is a diagram illustrating a modified example of a configuration of the image capturing device according to the present technology.

Further, as shown in the image capturing device 200 according to the modified example illustrated in FIG. 12, the present technology is also applicable to an image capturing device, which is equipped with a so-called image plane phase difference AF function and which includes the phase difference sensor 141 provided on the image sensor 140. Moreover, in the image capturing device 200 equipped with the image plane phase difference AF function, it is unnecessary to guide incident light to the phase difference sensor in a direction different from that of the image sensor 140, so a half mirror is unnecessary.

Additionally, the present technology may also be configured as below.

(1)

A display control device including:

a display control unit configured to control display, on a display unit, of highlighting corresponding to a state of an image depending on an in-focus state of a subject in the image being within a predetermined in-focus near range.

(2)

The display control device according to (1), in which the in-focus state is based on a magnitude of blur indicated by a focus evaluation value in the image.

(3)

The display control device according to (2), in which a highlighting threshold is set on the basis of the focus evaluation value and a predetermined value of a high frequency component in the image, and the highlighting is performed in a case where the predetermined value of the high frequency component is equal to or more than the highlighting threshold.

(4)

The display control device according to (2) or (3), in which the highlighting threshold is set to a value equal to or less than the predetermined value of the high frequency component in a case where the focus evaluation value is equal to or less than a predetermined value.

(5)

The display control device according to (3) or (4), in which the highlighting threshold is set to a value equal to or more than the predetermined value of the high frequency component in a case where the focus evaluation value is equal to or more than a predetermined value.

(6)

The display control device according to any of (3) to (5), in which the predetermined value of the high frequency component is a maximum value of the high frequency component.

(7)

The display control device according to any of (3) to (5), in which the predetermined value of the high frequency component is an average value of the high frequency component.

(8)

The display control device according to any of (3) to (5), in which the predetermined value of the high frequency component is an upper value of the high frequency component.

(9)

The display control device according to any of (3) to (8), in which the highlighting threshold is set from the focus evaluation value and the predetermined value of the high frequency component in the image in a case where the in-focus state is changed from outside of an in-focus near range to within the in-focus near range in a current frame and a previous frame, the current frame being a present frame, the previous frame being a temporally previous frame of the current frame.

(10)

The display control device according to any of (3) to (8), in which the highlighting threshold is set to a value equal to or more than the predetermined value of the high frequency component in a case where the in-focus state is changed from within the in-focus near range to outside of the in-focus near range between the previous frame and the current frame.

(11)

The display control device according to any of (3) to (8), in which the highlighting threshold used in the previous frame is set as the highlighting threshold of the current frame in a case where the in-focus state is not changed between the previous frame and the current frame.

(12)

The display control device according to any of (3) to (8), in which the focus evaluation value is acquired in a plurality of areas in the image, and the focus evaluation value is associated for each of the areas between frames by comparing the plurality of areas in a current frame that is a present frame and a previous frame that is a temporally previous frame of the current frame.

(13)

The display control device according to any of (3) to (8), in which the highlighting threshold is set from the focus evaluation value and the predetermined value of the high frequency component in the image in a case where the in-focus state is changed from outside of an in-focus near range to within the in-focus near range in the previous frame and the current frame.

(14)
The display control device according to any of (3) to (8), in which the highlighting threshold is set to a value equal to or more than the predetermined value of the high frequency component in a case where the in-focus state is changed from within an in-focus near range to outside of the in-focus near range in the previous frame and the current frame.

(15)
The display control device according to any of (3) to (8), in which the highlighting threshold used in the previous frame is set as the highlighting threshold of the current frame in a case where the in-focus state is not changed between the previous frame and the current frame.

(16)
The display control device according to any of (1) to (15), in which the in-focus near range is a range in which a magnitude of blur indicated by the focus evaluation value is equal to or less than a predetermined value.

(17)
The display control device according to (16), in which determination of whether the in-focus state is within the in-focus near range or outside the in-focus near range is determined on the basis of the magnitude of blur indicated by the focus evaluation value in the image.

(18)
The display control device according to any of (1) to (17), in which the highlighting is performed by performing processing of depicting a marker on a pixel constituting the image to increase a line along a contour of the subject and/or to thicken the line along the contour of the subject.

(19)
A display control method including:
controlling display, on a display unit, of highlighting corresponding to a state of an image depending on an in-focus state of a subject in the image being within a predetermined in-focus near range.

(20)
A display control program causing a computer to execute a display control method including
controlling display, on a display unit, of highlighting corresponding to a state of an image depending on an in-focus state of a subject in the image being within a predetermined in-focus near range.

REFERENCE SIGNS LIST

100 image capturing device
154 display control unit

What is claimed is:
1. A display control device, comprising:
circuitry configured to:
adjust a center frequency of a peak of a high-pass filter with respect to a high frequency component in an image, wherein the high frequency component is extracted by the high-pass filter;
adjust a display form of a pixel corresponding to an edge portion of a subject included in a determined area of the image to be displayed on a display unit, wherein the adjustment of the display form is based on a magnitude of blur corresponding to the determined area; and
control increase in a number of peaking markers in the image based on the adjustment of the center frequency and the adjustment of the display form.

2. The display control device according to claim 1, wherein the magnitude of the blur is indicated by a focus evaluation value in the image.

3. The display control device according to claim 2, wherein the circuitry is further configured to:
adjust the display form of the pixel by highlight of the pixel corresponding to the edge portion of the subject; and
set a value of a highlight threshold for comparison of each pixel in the image with the high frequency component in the image.

4. The display control device according to claim 3, wherein the circuitry is further configured to set the value of the highlight threshold based on the focus evaluation value.

5. The display control device according to claim 3, wherein
the circuitry is further configured to set the value of the highlight threshold based on a size of the blur in the image, and
the size of the blur is indicated by the focus evaluation value.

6. The display control device according to claim 3, wherein the circuitry is further configured to adjust the display form of the pixel by the highlight of the pixel corresponding to the edge portion of the subject with a peaking marker of the number of peaking markers.

7. The display control device according to claim 3, wherein
the circuitry is further configured to adjust, based on the adjustment of the center frequency, an ease and a difficulty of the increase in the number of peaking markers.

8. The display control device according to claim 7, wherein the circuitry is further configured to
adjust a peak width of the high-pass filter for the high frequency component in the image to adjust the ease and the difficulty of the increase in the number of peaking markers.

9. The display control device according to claim 7, wherein the circuitry is further configured to:
set the value of the highlight threshold based on the focus evaluation value and a value of the high frequency component in the image, and
perform the highlight of the pixel in a case where the value of the high frequency component is one of equal to or higher than the value of the highlight threshold.

10. The display control device according to claim 7, wherein
the circuitry is further configured to set the value of the highlight threshold to one of equal to or less than a value of the high frequency component in a case where the focus evaluation value is one of equal to or less than the value of the highlight threshold.

11. The display control device according to claim 7, wherein
the circuitry is further configured to set the value of the highlight threshold to one of equal to or higher than a value of the high frequency component in a case where the focus evaluation value is one of equal to or greater than the value of the highlight threshold.

12. The display control device according to claim 7, wherein a value of the high frequency component is a maximum value of the high frequency component.

13. The display control device according to claim 7, wherein a value of the high frequency component is an average value of a plurality of high frequency components.

14. The display control device according to claim 7, wherein a value of the high frequency component is a higher value among a plurality of high frequency components.

15. The display control device according to claim 3, wherein the circuitry is further configured to:
acquire the focus evaluation value of each of a plurality of areas in the image;
compare the plurality of areas between a current frame and a previous frame, wherein the previous frame temporally precedes the current frame; and
set the value of the highlight threshold based on the comparison of the plurality of areas.

16. The display control device according to claim 3, wherein
the circuitry is further configured to control a drawing process of a marker on the pixel of the image to one of increase a number of lines along a contour of the subject or thicken a line along the contour of the subject, and
the highlight of the pixel corresponds to the one of the increased number of lines along the contour of the subject or the thickened line along the contour of the subject.

17. The display control device according to claim 3, wherein the circuitry is further configured to:
determine an adjustment factor based on the focus evaluation value; and
set the value of the highlight threshold based on multiplication of a value of the high frequency component with the adjustment factor.

18. A display control method, comprising:
adjusting a center frequency of a peak of a high-pass filter with respect to a high frequency component in an image, wherein the high frequency component is extracted by the high-pass filter;
adjusting a display form of a pixel corresponding to an edge portion of a subject included in a determined area of the image to be displayed on a display unit, wherein the adjustment of the display form is based on a magnitude of blur corresponding to the determined area; and
controlling increase in a number of peaking markers in the image based on the adjustment of the center frequency and the adjustment of the display form.

19. The display control method according to claim 18, wherein the magnitude of the blur is indicated by a focus evaluation value in the image.

20. The display control method according to claim 19, further comprising:
adjusting the display form of the pixel by highlighting the pixel corresponding to the edge portion of the subject; and
setting a value of a highlight threshold for comparison of each pixel in the image with the high frequency component in the image.

21. A non-transitory computer-readable medium having stored thereon, computer-executable instructions which, when executed by a processor, cause the processor to execute operations, the operations comprising:
adjusting a center frequency of a peak of a high-pass filter with respect to a high frequency component in an image, wherein the high frequency component is extracted by the high-pass filter;
adjusting a display form of a pixel corresponding to an edge portion of a subject included in a determined area of the image to be displayed on a display unit, wherein the adjustment of the display form is based on a magnitude of blur corresponding to the determined area; and
controlling increase in a number of peaking markers in the image based on the adjustment of the center frequency and the adjustment of the display form.

\* \* \* \* \*